United States Patent [19]

Yoshida

[11] Patent Number: 4,764,277

[45] Date of Patent: Aug. 16, 1988

[54] SCREEN PLATE

[75] Inventor: Hideo Yoshida, Matsudo, Japan

[73] Assignees: Ishikawajima-Harima Jukogyo Kabushiki Kaisha; Ishikawajima Sangyo Kikai Kabushiki Kaisha, both of Japan

[21] Appl. No.: 33,804

[22] Filed: Apr. 3, 1987

[30] Foreign Application Priority Data

Apr. 8, 1986 [JP] Japan .................................. 61-79175

[51] Int. Cl.⁴ .............................................. B01D 39/10
[52] U.S. Cl. ..................................... 210/498; 209/397
[58] Field of Search ........................ 162/251; 210/498; 209/397

[56] References Cited

U.S. PATENT DOCUMENTS 3,617,008 11/1971 Lamort .................................. 241/88
3,847,813 11/1974 Castelli ................................. 210/498
4,529,520 7/1985 Lampenius ......................... 210/498

FOREIGN PATENT DOCUMENTS 601101 12/1959 Italy .

Primary Examiner—Ivars Cintins

[57] ABSTRACT

A plurality of circular or polygonal dents are formed at land portions on the inlet side surface of a screen plate so that oversize materials enter into the dents and scattered away from the surface of the screen plate and therefore the probability of the screen openings being clogged with oversize materials is decreased.

1 Claim, 4 Drawing Sheets

SCREEN PLATE

BACKGROUND OF THE INVENTION

The present invention relates to a screen plate used in paper and pulp industry to separate foreign matter such as shives and undefibred paper fragments, plastic fragments, hairs, sand, metal fragments and the like from pulp slurry.

In paper and pulp industry, screens have been used to separate foreign matter from pulp slurry at a consistency of the order of 0.3-2.5%.

Particularly screens having screen plates with slots are widely used, because the slots may be narrowed and the fine slots with the narrowed width are very effective for separating adhesive foreign matter such as hot melt which tend to become very fine spherical particles.

FIGS. 4 and 5 show a screen plate having slots. FIG. 4 is a plan view while FIG. 5 is a sectional view. Reference numeral 1 represents a screen plate; 2, slots; 3, a scraper blade; and 7, land portions. Width of the slots 2 is narrow at the pulp slurry inlets and is wide at pulp slurry outlets so that the slots are prevented from being clogged.

The narrow width of the slots 2 for enhancement of screening efficiency will cause a problem that a quantity of the slurry passing through a unit area of the screen plate is naturally decreased and consequently screening capability is lowered. Meanwhile, there is a demand for passing high consistency pulp slurry through a screen plate for facilitation of simplifying a pulp slurry thickening device as well as for attainment of reducing power required for transporting the pulp slurry. Such high consistency pulp slurry is difficult to pass through a screen and a reject quantity must be increased so that a considerable quantity of good-quality fibers are discharged as reject.

As shown in FIG. 5, the scraper blade 3 may be of the type which sucks foreign matter hydrodynamically by negative pressure induced along rear edge portions of the blade 3. Alternatively, a blade 3' as shown in FIG. 6 and of a mechanical type may be used which scrapes the surface of the screen.

The screen plates 1 are in the form of a cylinder or a disk.

In order that the high consistency pulp slurry may pass through the screen plate of the type described above and in increased quantity, frequency of the scraper blade passing for scraping the openings must be increased. To this end, it suffices to increase a scraping blade speed or to increase the number of scraping blades; however, the former is disadvantageous in that the power for driving the scraping blade must be increased and the latter results in hindrance of the pulp slurry passage.

In order to overcome the above-described problems, various proposals for changing the shape of the screen plate itself to increase the quantity of pulp slurry passing through the screen plate have been made and attained some improved effects. For instance, (1) there has been proposed a screen plate (Japanese Patent 2nd Publication No. 36958/1960) in which, as shown in plan view in FIG. 7 and in section in FIG. 8, an elongated groove is formed on the land portion 7 between the adjacent slots 2 so that the flow of pulp slurry at inlet side of the screen plate 1 is disturbed and consequently the pulp fibers are oriented in the direction of the pulp flow in the slots 2; (2) there has been also proposed a screen plate (Japanese Patent 2nd Publication No. 25138/1978) in which, as shown in cross section in FIG. 9, the downstream side edge of each slot 2 is lower than the upstream side edge thereof in the direction of the flow of pulp slurry so that leading ends of the pulp fibers flowing over in parallel with the screen plate may easily enter the slots 2, thereby increasing the quantity of pulp slurry passing through the screen plate; and (3) there has been further proposed a screen plate (as disclosed in Japanese Patent 1st Publication No. 137594/1984) in which, as shown in section in FIG. 10, each slot 2 is formed through the bottom of each groove c so that leading ends of pulp fibers flowing over in parallel with the screen plate may easily enter the slots 2, thereby increasing the quantity of pulp slurry passing through the screen plates.

However, in the case of the screen plate described in (1), screening capability is not always increased to a satisfactory extent. In the cases of the screen plates described above in (2) and (3), turbulence occurs at each of the slots 2 so that the openings 2 tend to be worn and increase in size, causing the decrease in screening efficiency. Furthermore, from the standpoint of the structure of these screen plates, the depth of groove is limitative (and in general is of the order of 0.5-0.7 mm) so that the side wall b on the downstream side is worn rapidly and as a result, screening capability is rapidly decreased and service life of the screen plate is considerably short.

In the above-described conventional structures, the screen plates are 3-8 mm in thickness t; the width d of the slots is of the order of 0.1-1 mm; and the pitch e of the slots is of the order of 4-15 mm.

The present invention was made to substantially overcome the above and other problems encountered in the conventional screen plates and has for its object to provide a screen plate which can increase the quantity of pulp slurry passing through the screen plate while maintaining a high degree of screening efficiency and which ensures a long service life of the slots screen plate.

DETAILED DESCRIPTION OF THE PREFERRED EMBODIMENT

Figure 1:
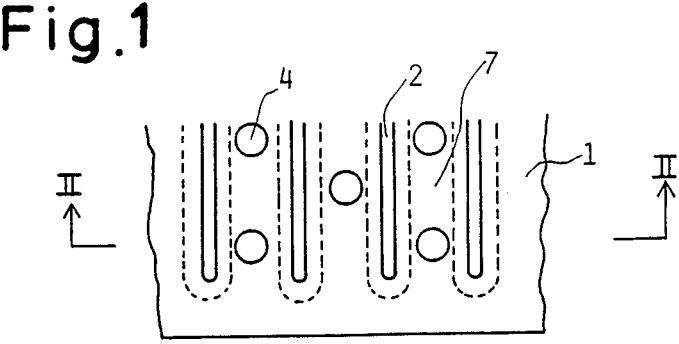
FIG. 1 is a plan view of a screen plate in accordance with the present invention.
Figure 2:
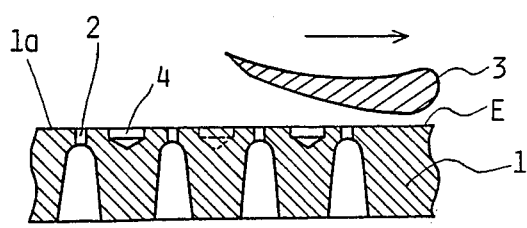
FIG. 2 is a sectional view taken along the line II—II of FIG. 1.
Figure 3:
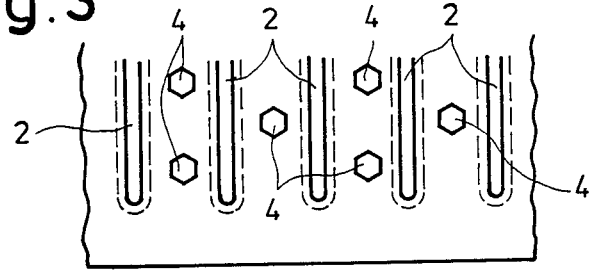
FIG. 3 is a plan view similar to FIG. 1, but shows another example of the recesses.
Figure 4:
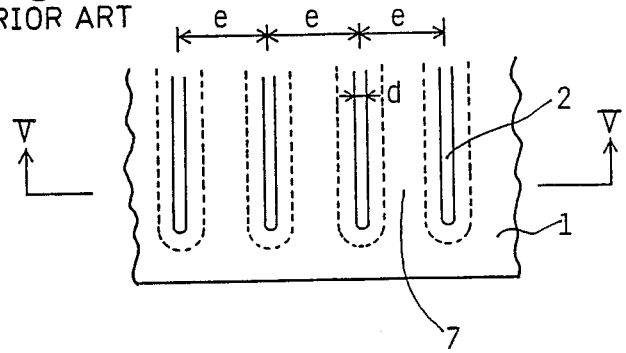
FIG. 4 is a plan view of a conventional screen plate.

A preferred embodiment of a screen plate in accordance with the present invention which can attain the above-described object is shown in plan view in FIG. 1 and in cross section in FIG. 2. In a screen plate 1 of the type having a plurality of slots 2 thereon and in which clogging of the openings is eliminated by the scraper blade 3 moving along a surface E of the screen plate 1, the present invention provides a plurality of circular dents 4 on the land portion 7 of the upper surface E of the screen plate. Alternatively, the dents 4 may be in the form of polygon as shown in FIG. 3.

Figure 5:
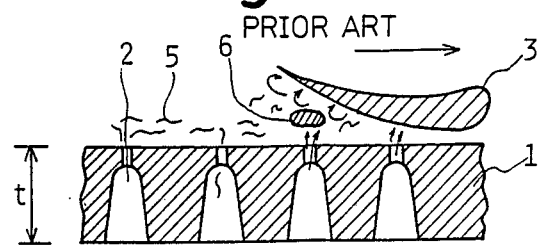
FIG. 5 is a sectional view taken along the line V—V of FIG. 4.
Figure 6:
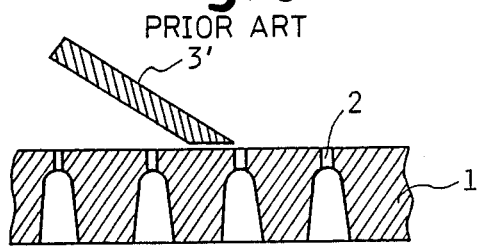
FIG. 6 is a sectional view similar to FIG. 5, but illustrates the type in which a mechanical scraper blade is used.
Figure 11A:
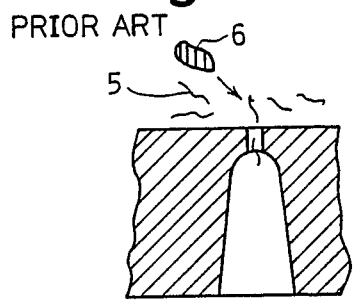
FIGS. 11(a) and 11(b) are views used to explain the mode of operation of the conventional screen plate.
Figure 11B:
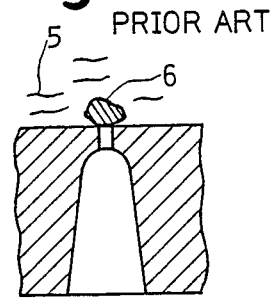

In general, when pulp slurry containing foreign matter is forced to pass through a screen plate, pulp fibers pass through openings of the screen plate as shown in FIG. 11(a), but an oversize material is trapped at the inlet of the opening as shown in FIG. 11(b) so that the so-called screening is made. The oversize foreign matter clogs the opening so that the quantity of pulp slurry passing through the screen plate is gradually decreased. In order to remove the oversize foreign matter from the opening, the blade 3 as shown in FIG. 5 or the blade 3' as shown in FIG. 6 is used to displace the foreign matter in the direction in parallel with the blade 3 moving and discharge the same out of the system as reject.

However, the pulp fibers adjacent to screen plate are oriented in the direction of movement of the blade due to the blade action so that there is a tendency that it is difficult for pulp fibers to pass through the openings of the screen in the direction perpendicular to the direction of movement of the scraping blade. Therefore, as disclosed in the above-described Japanese Patent 2nd Publication Nos. 36958/1970 and 25138/1978 and Japanese Patent 1st Publication No. 137594/1984, there has been proposed a method in which the turbulence flows are caused adjacent to the screen plate so that the orientation of fibers is disturbed so as to increase the quantity of pulp fibers passing through the screen plate.

Figure 12:
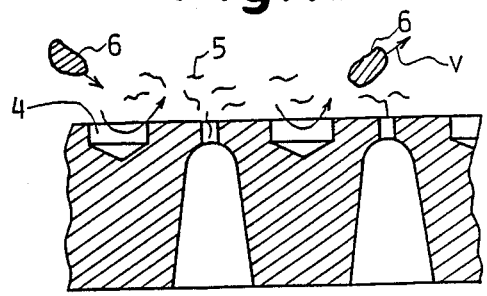
FIG. 12 is a sectional view used to explain the mode of operation of a screen plate in accordance with the present invention.

The present invention also causes the turbulence adjacent to the screen plate as described above and is based upon the following facts:

(1) Mass M of an oversize material is several times or tens times as large as the mass m of a pulp fiber. Therefore, even when the pulp fibers 5 and the oversize materials 6 are scattered away from the screen plate 1 at the same velocity v due to the influence of the dents 4 as shown in FIG. 12, each pulp fiber 5 has a small degree of momentum mv and is caused to immediately return toward the screen plate 1 due to the influence of the pulp slurry flowing through the openings 2 whereas each oversize material 6 has a large degree of momentum Mv and rarely return toward the screen plate 1. As a result, when the positional relationship between the dents 4 and the slots 2 is suitably selected, the probability of clogging the slots 2 with the oversize materials can be drastically decreased.

Figure 7:
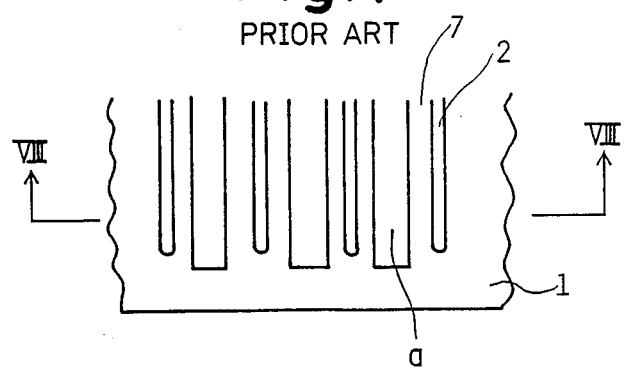
FIG. 7 is a plan view of a screen plate of the type disclosed in Japanese Patent 2nd Publication No. 36958/1960.
Figure 8:
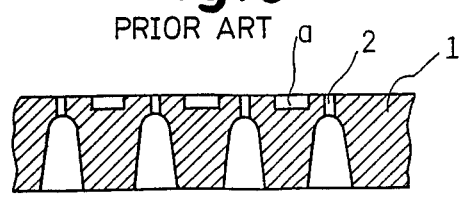
FIG. 8 is a sectional view thereof taken along the line VIII—VIII of FIG. 7.
Figure 13:
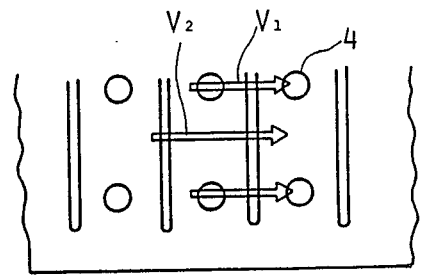
FIG. 13 is a plan view used to explain the mode of operation of a screen plate in accordance with the present invention.

(2) Unlike the screen plate as shown in FIG. 7 (and is disclosed in detail in Japanese Patent 2nd Publication No. 36958/1970), the dents are not in the form of elongated grooves but are spotted at the land portions 7 between the adjacent slots 2. As a result, as shown in FIG. 13, velocity $V_1$ of the pulp slurry flowing along each dent 4 in the direction of the movement of the blade 3 is different from velocity $V_2$ of the pulp slurry flowing in the direction of the movement of the blade 3 along surface without dents 4 ($V_1$ is slower than $V_2$) so that shearing forces act between the flows at different velocities, causing greater turbulence in the flows. As a result, the quantity of pulp fibers passing through the slots 2 becomes larger than that in the case of the screen plate of the type shown in FIG. 7.

The improved screening capacity in accordance with the present invention will be described in terms of comparing the test results with the conventional screen plate A having no dents, the screen plate B having the circular dents in accordance with the present invention and the screen plate C having the grooves as shown in FIG. 7.

Figure 14A:
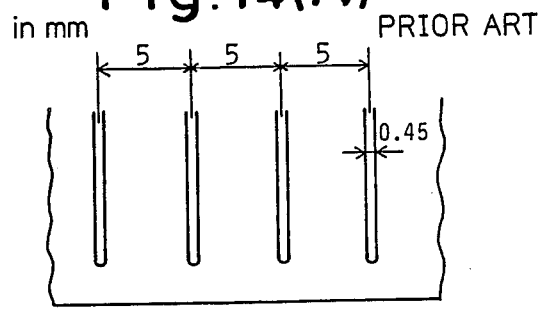
FIGS. 14(A), 14(B) and 14(C) are plan views of the screen plates, respectively, used in the experiments and also show the sizes of respective screen plates.
Figure 14B:
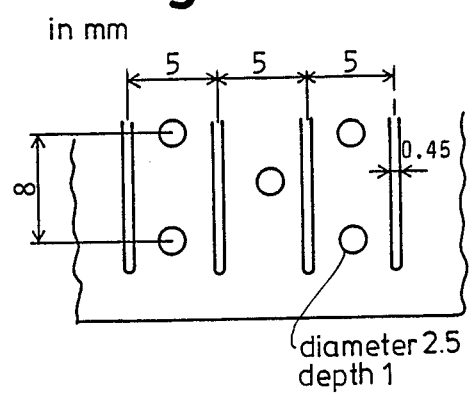
Figure 14C:
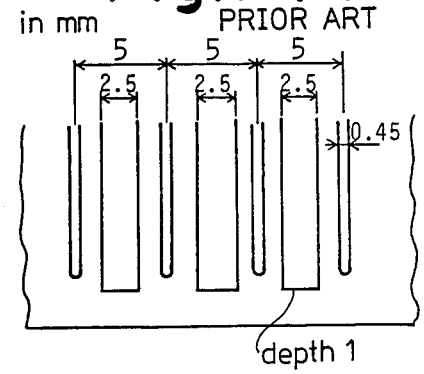

FIGS. 14(A), 14(B) and 14(C) are plan views of the screen plates A, B and C, respectively, used in the tests and the results of the tests are shown in TABLE 1.

TABLE 1

| | | Screening of old corrugated carton | | | | | | | | | | | |
|---|---|---|---|---|---|---|---|---|---|---|---|---|---|
| | | Used as primary screen | | | | | | Used in reject processing | | | | | |
| Running conditions | | Normal operation | | | Operation at low reject rate | | | Normal operation | | | Operation at low reject rate | | |
| Plate type | | A | B | C | A | B | C | A | B | C | A | B | C |
| Consistency in % at inlet | | | 1.76 | | | 1.76 | | | 1.75 | | | 1.75 | |
| Processed quantity, tons/day | Inlet | 20 | 31.8 | 21.5 | 19.3 | 24.1 | 20.6 | 16.3 | 19.8 | 17.0 | 13.7 | 18.0 | 13 |
| | Outlet | 16 | 25.6 | 17.3 | 16.9 | 22.8 | 18.8 | 9.3 | 12.8 | 10.3 | 10.5 | 14.7 | 10 |
| | Reject | 4 | 6.2 | 4.2 | 2.4 | 1.3 | 1.8 | 7.0 | 7.0 | 6.7 | 3.2 | 3.3 | 3 |
| Reject rate in % | | 20 | 19.5 | 19.6 | 12.4 | 5.4 | 8.7 | 42.9 | 35.4 | 39.4 | 23.4 | 18.3 | 23.1 |
| Capability coefficient | | 80 | 131 | 88 | 136 | 422 | 216 | 21.7 | 36.2 | 26.1 | 45 | 80 | 43.3 |
| Ration between capability coefficients | | 1 | 1.64 | 1.10 | 1 | 3.10 | 1.61 | 1 | 1.67 | 1.2 | 1 | 1.78 | 0.95 |

Note:

Capability coefficient = $\dfrac{\text{Processed quantity at outlet, tons/day} \times 100}{\text{Reject ratio in \%}}$ As is apparent from TABLE 1, when the screen plates A, B and C were used as primary screen and the reject rate was selected about 20% as in the case of the normal operation, the screening capacity of the present invention (the screen plate B) is about 1.6 times as high as that of the screen plate A and is about 1.5 times as high as that of the screen plate C.

The screening capacity or capability is very closely dependent upon the reject rate and when the reject rate is low, the screening capability is decreased. Therefore, a value obtained by dividing the processed quantity at the outlet (i.e., the quantity of pulp fibers passing through the screen plate) by the reject rate is a very important factor for determining the screening capability so that in this specification this value is referred to as "screen capability coefficient". As is shown in the lowermost row in TABLE 1, the screening capability coefficient of the screen plate B in accordance with the present invention is by far higher than those of the screen plates A and C.

The sizes of the dents 4 defined in accordance with the present invention are shown in TABLE 2.

TABLE 2

|  | Range | Preferred Range |
| --- | --- | --- |
| Diameter of dent in mm | 0.5–10 | 2–5 |
| Depth of dent in mm | 0.3–5 | 0.5–3 |
| Pitch of dent in mm | 2–25 | 5–15 |

The shape of the dents 4 is not limited to a circle and may be a polygon as mentioned above. Furthermore, the bottom of each dent may be flat or conical.

The screen plate in accordance with the present invention described above has the following effects:

(1) A plurality of circular or polygonal dents are formed in the land portions between the adjacent slots, so that the oversize foreign materials are forced to move away from the slots. As a result, the slots are substantially prevented from being clogged with oversize materials and furthermore, a degree of turbulence is increased due to shearing forces caused by the difference in velocity between the flows of pulp slurries flowing along the screen plate so that the pulp fibers passing through the screen plate are increased in quantities and therefore the screen processing capability is increased.

(2) The depth of each circular or polygonal dent can be sufficiently deep and wear and abrasion of the side walls of the circular or polygonal dents are by far less as compared with the groove-shaped recesses so that a service life of the screen plate can be increased.

Figure 9:
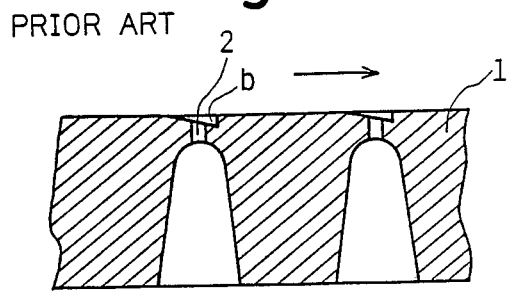
FIG. 9 is a sectional view of a screen plate of the type described in Japanese Patent 2nd Publication No. 25183/1978.
Figure 10:
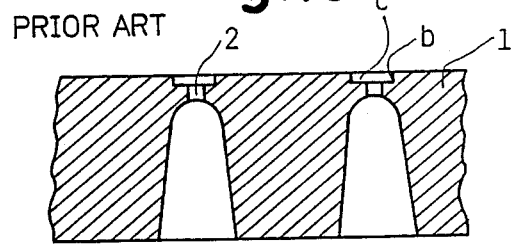
FIG. 10 is a sectional view of a screen plate of the type disclosed in Japanese Patent 1st Publication No. 137594/1984.

(3) As compared with the screen plates of the type shown in FIGS. 9 and 10 in which pulp slurry is forced to become turbulent, change in size of each circular or polygonal dent due to wear hardly results so that a service life of the screen plate is long.

(4) In the screen plates of the types as shown in FIGS. 9 and 10, the pulp slurry flow is partially prevented by the side wall on the downstream side of the recess so as to force the pulp fibers into the slots. Such prior art is problematic in that the foreign materials tend to be mixed on the accept side, that is, the screening efficiency is low. By contrast, according to the present invention, even when the outlet quantity is increased, the screening efficiency is almost maintained unchanged.

What is claimed is:

1. A pulp slurry screen plate having a plurality of parallel slots thereon, wherein clogging of the slots is eliminated by a scraper blade moving along a surface of said screen plate, comprising a plurality of discontinuous dents being formed on land portions between the slots of an inlet side surface of said screen plate, said dents being in the form of a circle.

* * * * *